United States Patent
Eriksson (10) Patent No.: US 8,881,678 B2
(45) Date of Patent: Nov. 11, 2014

(54) SCRAPING DEVICE FOR REMOVING OBJECTS FROM A ROTARY MILKING PLATFORM

(75) Inventor: Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 40 days.

(21) Appl. No.: 13/807,748

(22) PCT Filed: Jul. 5, 2011

(86) PCT No.: PCT/SE2011/050913
§ 371 (c)(1),
(2), (4) Date: Dec. 31, 2012

(87) PCT Pub. No.: WO2012/011861
PCT Pub. Date: Jan. 26, 2012

(65) Prior Publication Data
US 2013/0097791 A1    Apr. 25, 2013

Related U.S. Application Data

(60) Provisional application No. 61/372,215, filed on Aug. 10, 2010.

(30) Foreign Application Priority Data

Jul. 19, 2010   (SE) .................................... 1050814

(51) Int. Cl.
*A01J 5/00*    (2006.01)
*A01J 7/02*    (2006.01)
*A01K 1/01*    (2006.01)
*A01K 1/12*    (2006.01)

(52) U.S. Cl.
CPC ................. *A01J 7/02* (2013.01); *A01K 1/0128* (2013.01); *A01K 1/126* (2013.01)
USPC .......................... 119/14.04; 119/451; 15/256.5

(58) Field of Classification Search
USPC ............ 119/14.04, 14.03, 14.01, 14.18, 451, 119/447, 479; 15/256.5, 93.1

IPC ........................................................... A01J 5/00
See application file for complete search history.

(56) References Cited

U.S. PATENT DOCUMENTS 1,572,913 A  *  2/1926  Finnell ............................... 15/98
2,906,514 A  *  9/1959  Becker .......................... 299/37.1

(Continued)

FOREIGN PATENT DOCUMENTS

DE   103 26 661 A1   12/2004
EP   1 523 881 A2    4/2005

(Continued)

OTHER PUBLICATIONS

Machine translation of DE 10326661 to Moelleman et al., published Dec. 2004 (cited on IDS dated Dec. 31, 2012).*

(Continued)

*Primary Examiner* — Rob Swiatek
*Assistant Examiner* — Kathleen Alker
(74) *Attorney, Agent, or Firm* — Young & Thompson (57) ABSTRACT

The invention relates to a scraping device (14) for removing objects from a floor surface (1c) of a rotary milking platform (1). The scraping device (14) includes a scraper (18) configured to come into contact with and move an object on the floor surface (1c) of the rotary milking platform (1) during rotation, and a suspension device selectively supporting the scraper (18). The suspension device selectively supports the scraper (18) in each of i) a first position adjacent to the floor surface (1c) of the rotary milking platform (1) and ii) a second position in which the scraper (18) is pressed against the floor surface (1c) with a first force. The suspension device is configured to move the scraper (18) from the first position to the second position when the object on the floor surface (1c) hits the scraper (18) during rotation of the rotary milking platform (1).

20 Claims, 5 Drawing Sheets

(56) References Cited

U.S. PATENT DOCUMENTS

| | | | |
|---|---|---|---|
| 3,103,912 A | 9/1963 | Benedetto | |
| 3,919,976 A * | 11/1975 | Meyer et al. | 119/447 |
| 4,123,992 A * | 11/1978 | Laurenz | 119/451 |
| 6,446,298 B1 * | 9/2002 | Berg et al. | 15/93.1 |
| 6,948,450 B2 * | 9/2005 | Berg | 119/451 |

FOREIGN PATENT DOCUMENTS

| | | | | |
|---|---|---|---|---|
| EP | 1523879 A2 | | 4/2005 | |
| EP | 1523880 A2 | | 4/2005 | |
| EP | 1523882 A2 | | 4/2005 | |
| FR | 2917573 A1 | * | 12/2008 | A01K 1/01 |
| FR | 2939007 A1 | * | 6/2010 | A01K 1/01 |
| GB | 1 096 952 A | | 12/1967 | |
| GB | 2 355 639 A | | 5/2001 | |
| GB | 2430611 | * | 4/2007 | B08B 3/02 |
| GB | 2448713 A | * | 10/2008 | A01K 1/01 |
| JP | 3-19637 A | | 1/1991 | |
| SU | 649376 A1 | | 2/1979 | |
| SU | 1375202 A1 | | 2/1988 | |
| SU | 1732884 A1 | | 5/1992 | |
| WO | 2010/107300 A1 | | 9/2010 | |

OTHER PUBLICATIONS

Machine translation of FR 2917573 to Vandaine, published Dec. 2008.*

Machine translation of FR 2939007 to Mimault et al., published Jun. 2010.*

Chinese Office Action, dated Nov. 28, 2013, from corresponding CN application.

International-Type Search Report, dated Jan. 12, 2011, from corresponding PCT application.

International Search Report, dated Feb. 20, 2012, from corresponding PCT application.

Supplementary International Search Report, dated Oct. 25, 2012, from corresponding PCT application.

* cited by examiner

SCRAPING DEVICE FOR REMOVING OBJECTS FROM A ROTARY MILKING PLATFORM

BACKGROUND OF THE INVENTION AND PRIOR ART

The present invention relates to a scraping device for removing objects from a floor surface of a rotary milking platform, wherein the scraping device comprises a scraper and a suspension device adapted to support the scraper.

Usually, a rotary milking platform is provided with fence members forming milking stalls for the animals to be milked on the platform and storing devices for teat cups and other milking equipment in the milking stalls. The presence of such components on the platform makes it difficult to find a free space for a scraper removing manure from the platform. Usually, the floor surface of especially metal platforms is formed by a pattern structure preventing cows from slipping. A scraper working in contact with such an uneven floor surface produces vibrations and noise. In case the scraper is supported by elongated support elements, the vibrations and noise can be very excessive.

It is known to squirt water on the floor surface of rotary milking platforms in order to remove manure. Water may be squirt on the floor surface of a milking stall each time the milking stall reaches a predetermined rotary position. In this case, the water is squirted on the floor surface in the milking stall even if the floor surface is free from manure. Alternatively, water is squirted on the floor surface of the milking stalls at predetermined intervals. In this case, there is a risk that the floor surface in a milking stall is not clean when it is entered by a following cow. Furthermore, a cleaning process with water requires a high consumption of water for removing manure from a floor surface in an effective manner. Since water is a scarce commodity in many parts of the world, it is desired to reduce the consumption of water.

EP 1 523 881 shows a cleaning device for a rotary milking platform. The cleaning device comprises four different sets of components cleaning the floor surface of the platform. All these components are movably arranged in a radial direction on the annular platform. A first set of components include manure slides adapted to detach impurities from the platform, a second set of components include movable spraying devices adapted to spray or squirt a cleaning liquid on the platform, a third set of components include a rotatable cleaning brush adapted to brush the platform and a fourth set of components including juxtaposed blow nozzles for drying the platform. This cleaning device is complicated and expensive to install. Furthermore, it requires a lot of space and a platform which is substantially free from components.

SUMMARY OF THE INVENTION

The object of the present invention is to provide an automatic scraping device for a rotary milking platform having a relatively simple construction and which removes objects, such as manure, from the floor surface in an effective manner at the same time as it is relatively silent during operation.

This object is obtained, according to the invention, by the feature that the suspension device is adapted to support the scraper in a first position adjacent to the floor surface of the platform and, when an object on the floor surface hits the scraper, to move the scraper from the first position to a second cleaning position, in which the scraper is pressed against the floor surface with a force. A rigidly mounted scraper in continuously contact with a floor surface of a rotary platform produces many times continuously excessive vibrations and noise. In this case, the scraper is only moved to the second cleaning position when it has to be used for removing object, such as manure, from the platform. The remaining time, the scraper is in the first position in which vibrations substantially not are produced. The scraper is usually in the first position a longer time than the time in the second position. Thereby, the scraper will not produce vibrations and noise during a main part of the operating time of the milking platform.

According to the invention, the suspension device is adapted to support the scraper in a first position in contact with the floor surface. In this case, the lower portion of the scraper may be pressed against the floor surface with a lower force than in the second position. This force may be derived from substantially the weight of the scraper. In the first position, the scraper may clean the floor surface from light objects, which are too light for moving the scraper from the first position to the second cleaning position. Alternatively, the suspension device is adapted to support the scraper in a first position above the floor surface of the platform. In this case, there is no risk at all that vibrations and noise are produced in the first position. The scraper may be supported in the first position at a smaller level than 2 cm above the floor surface, preferably at a smaller level than 1 cm above the floor surface. When manure or another relatively heavy object on the platform hits the scraper, the scraper is automatically moved to the second position where it is pressed against the floor surface with a force such that it is able to remove the manure from the platform. Such an automatic activation of the scraper is very reliable and may be performed with a relatively simple suspension device.

According to a preferred embodiment of the invention, the suspension device comprises a force transmitting mechanism adapted to transfer the force from an object on the platform when it hits the scraper to a force pressing the scraper against the floor surface. Thereby, the scraper will be pressed against the floor surface in the second position with a force related to the weight of the object. Thus, if a large amount of manure has to be removed from floor surface, the scraper is pressed with a larger force on the surface than if a smaller amount of manure has to be removed. Preferably, the suspension device comprises a spring member adapted to hold the scraper in the first position with a spring force. Such a spring member counteracts the displacement of the scraper from the first position to the second position with a yieldable force. Further, the spring member displaces the scraper back to the first position as soon as the force acting on the scraper ceases. Furthermore, the spring member provides a resilient suspension of the scraper. The resilient suspension of the scraper damps vibrations and noise in an effective manner.

According to an embodiment of the invention, the suspension device comprises a first element connected to the scraper, a second element, and a movable connection between the first element and the second element defining a path of movement of the scraper when it is moved from the first position to the second position. The scraper may be fixedly connected to the first element. In this case, the first element and the scraper are displaced as a unit along the path of movement from the first position to the second position.

According to an embodiment of the invention, said movable connection may define a path of movement of the scraper which initially raises the scraper to a higher level above the floor surface than in the first position before it is lowered to the level of the floor surface in the second position. In case the scraper is arranged at a level very close to the floor surface or in contact with the floor surface in the first position, there is a risk that the scraper hits and get stuck on an obstacle such as an upwardly protruding part of the floor surface. According to this embodiment, the scraper will be initially moved to a higher level such that it is able to be moved past such possible protruding parts of the floor surface. As soon as the contact between the protruding part and the scraper ceases, the scraper will be displaced back to the first position by means of the spring member. In this embodiment, the movable connection may comprise two parallel arms pivotally connected to the first element portion at an end portion and pivotally connected to the second element at an opposite end portion. Such a movable connection results in a path of movement for the scraper in the form of a part of a circle.

According to an alternative embodiment of the invention, said movable connection defines a path of movement of the scraper which continuously lowers the scraper from the first position to the second position. In this case, the scraper has to be mounted at a level above the floor surface with a margin of error such that the scraper does not risk coming in contact with a protruding part of the floor surface. The movable connection may, in this embodiment, comprise an elongated recess in the first element or in the second element and a protruding member in the remaining element which is displaceably arranged into the elongated recess.

According to a further embodiment of the invention, the second element is supported by a framework stationary arranged in a position at the side of the platform. The framework may be stationary arranged in a position radially outside of an outer edge portion of the annular platform or in a position radially inside of an inner edge portion of the annular platform. Such a framework has usually to be relatively elongated. In this case, there is substantially no risk for vibrations even if the scraping device is supported in an elongated frame work. Alternatively the framework is stationary arranged in a roof element or the like having an extension above the platform.

According to a further embodiment of the invention, the scraping device comprises at least one nozzle, which is adapted to supply a cleaning liquid to an area of the floor surface located on a rear side of the scraper. Even if the scraper is pressed against the floor surface with a relatively large force in the second position, a small part of the manure can move past the scraper. Such a part of the manure will be removed from the floor surface on the rear side of the scraper by means of the cleaning liquid. The cleaning liquid may be water or water with a suitable detergent. The consumption of the cleaning liquid will be low since it is only used to remove small part of the manure moving past the scraper. Preferably, the scraping device comprises control means for automatic activation of the supply of the cleaning liquid to said area when the scraper is in the second position. Thereby, the cleaning liquid is only supplied to the floor surface of platform when the scraper is used. Thus, the consumption of cleaning liquid will be further reduced.

According to a further embodiment of the invention, the scraper has a extension between a first end arranged at a first radial distance from a rotational center of the platform and a second end arranged at a second radial distance from the rotational center of the platform such that objects located on the floor surface of the platform at a radial distance between the first radial distance and said second radial distance comes in contact with the scraper. The scraper may have a straight line extension between the ends or a suitable curved extension. In connection to the milking processes of the animals on the platform, there is always a risk that a teat cup comes loose and falls down on the floor, it is by hygienic reasons important that the scraping device has an extension such that it is able to clean at least the part of the floor surface in the milking stalls where the teat cups risk to fall down. This part of the floor surface is located below the rear portion and the udder of a milking animal standing in a milking position in a milking stall.

According to a further embodiment of the invention, the elongated scraper has an inclination in relation to the direction of movement of an object on the floor surface on the front side of the scraper such that the scraper guides the object in a radially direction on the floor surface towards an inner edge portion or an outer edger portion of the annular platform. Preferably, the scraper guides all objects on the floor surface to a common position at the outside or at the inside of the platform.

The scraping device may comprise a storage device adapted to receive objects which have been removed from the platform by the scraper. The storage device may be a container or the like. Alternatively, the storage device may include a transport device moving the objects to a storing unit at a distance from the platform.

According to a further embodiment of the invention, the scraper has an additional scraping device at one of its ends, which has flexible properties. Many milking platforms are provided with post elements on the floor surface at the inner edge portion and/or the outer edge portion. Due to the flexible properties of the additional scraping device, it is able to move past such post elements and clean the floor surfaces between the post elements. Furthermore, such a flexible scraping device is able to guide objects on the floor to a storing device arranged outside or inside the platform.

BRIEF DESCRIPTION OF THE DRAWINGS

In the following, preferred embodiments of the invention are described as examples and with references to the attached drawings, in which.

BRIEF DESCRIPTION OF PREFERRED
EMBODIMENTS OF THE INVENTION

Figure 1:
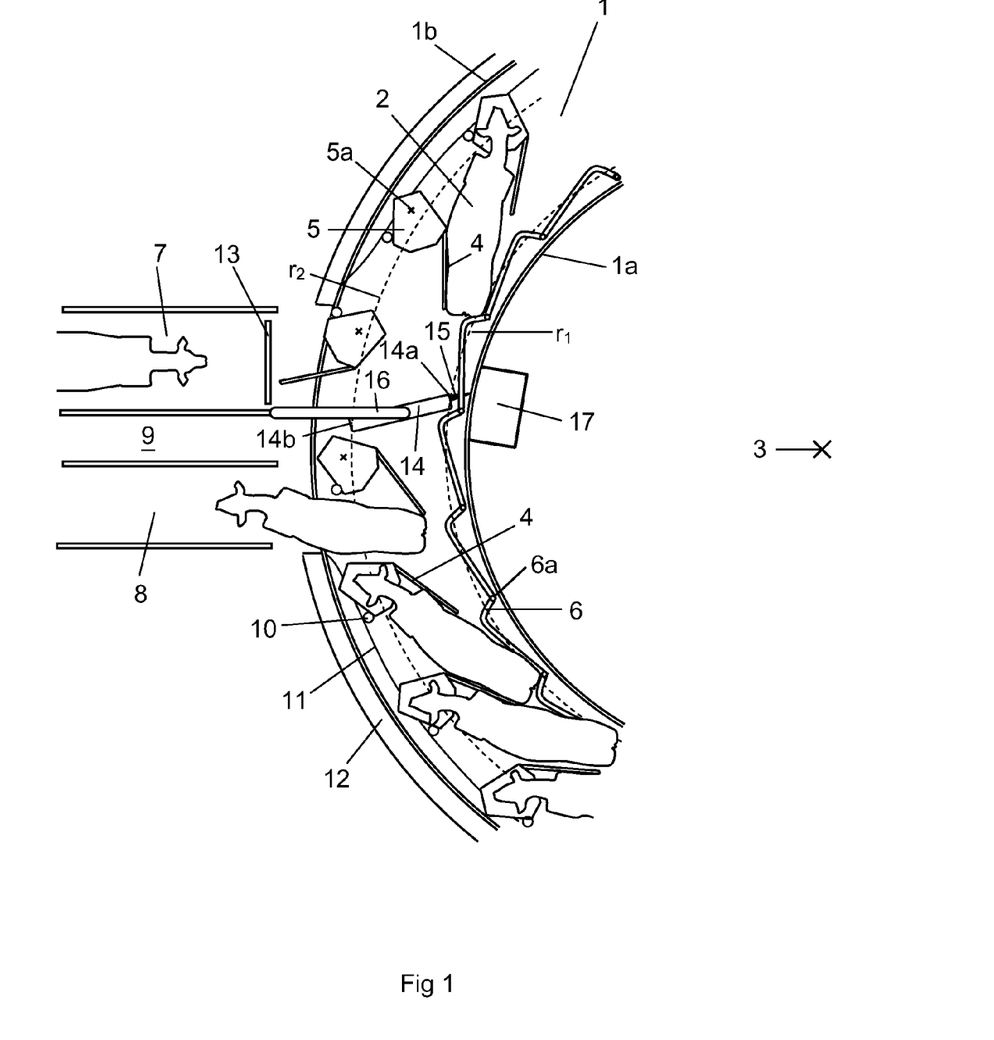
FIG. 1 shows a scraping device according to the invention arranged on a rotary milking platform.

FIG. 1 shows a part of a rotary annular platform 1 for milking of cows 2. The annular platform 1 has an inner edge portion 1a and an outer edge portion 1b. The platform 1 rotates around a centre of rotation 3. Turntable fence members 4 are here used for dividing the platform 1 into milking stalls for receiving individual cows 2. By the use of turnable fence members 4, it is possible to position the cows 2 very close to each other on the platform 1. In this case, each fence member 4 is fixedly connected to a feeding trough 5. The feeding troughs 5 attract the cows 2 and facilitate the positioning of the cows 2 in the milking stalls. Each feeding trough 5 is mounted on a rotatable post element 5a on the platform 1. Thereby, the fence member 4 and the feeding trough 5 are turnable as a unit on the platform 1. A rump rail 6 is arranged at the vicinity of inner edge portion 1a of the platform 1. The rump rail 6 is adapted to position a rear portion of the cows 2 in the milking stalls. Furthermore, the rump rail 6 is adapted to prevent the cows 2 from accidentally falling or stepping out of the platform 1. The rump rails 6 are mounted on post members 6a fixedly connected to the platform 1 in the vicinity of the inner edge portion 1a.

In the milking stalls, the cows 2 have their heads in the vicinity of the outer edge portion 1b of the platform 1 and the rear portions in the vicinity of the inner edge portion 1a of the platform 1. The cows 2 are here arranged in a herringbone pattern. An entry 7 and an exit 8 for the cows 2 are located at the outer edge portion 1b of the platform 1. A gangway 9 for operators to the inner space of the annular platform 1 is located between the entry 7 and the exit 8. Each feeding trough 5 comprises a guide wheel 10 adapted to roll along a guide rail 11 on a wall 12 extending around the platform 1. When the guide wheels 10 roll along the guide rail 11, the fence members 4 and the feeding troughs 5 are turned to predetermined turning positions on the platform 1. Further guide means, not shown, turns the fence members 4 and the feeding troughs 5 to predetermined turning positions in the vicinity of the entry 7 and the exit 8 where the guide wheels 10 are out of contact with the guide rail 11.

Cows 2 to be milked walk to the entry 7. A gate 13, which is movably arranged between a closed position and an open position, controls the access to the platform 1. When a cow 2 has received access to the platform 1 and entered a milking stall, an operator or a milking robot attaches teat cups to the cow 2 from the inner space of the annular platform 1. Thereafter, the milking process starts. When the milking process is finished, the teat cups are automatically removed from the cow 2. The cow 2 leaves the platform 1 and enters the exit 8. There is always a risk that teat cups come loose and falls down on the floor surface of the platform in connection to the milking processes on the platform 1. The teat cups risk many times to fall down on an area of the floor surface containing manure from previously milked cows. Thus, it is important that a milking stall on the platform 1 is free from manure when it is entered by a following cow 2.

In order to remove manure from the milking stalls on the rotary platform 1, an elongated scraping device 14 is arranged on the platform. The scraping device 14 is mounted in a position between the exit 8 and the entry 7. Consequently, the scraping device 14 is able to clean a milking stall before it is entered by a following cow. The scraping device 14 has a straight line extension between a first end 14a and a second end 14b. However, it is possible to give the scraping device 14a somewhat curved extension between the ends 14a, b. The first end 14a is arranged at a first radial distance $r_1$ from the rotational center 3 of the platform 1 and the second end 14b is arranged at a second radial distance $r_2$ from the rotational center 3 of the platform 1. Thus, the scraping device 14 is able to come in contact with manure lying on the platform 1 at radial distances between the first radial distance $r_1$ and the second radial distance $r_2$.

The scraping device 14 has an additional scraping portion 15 at its first end 14a. The additional scraping portion 15 is made of a flexible material such as rubber. The scraping device 14 is mounted with an inclination in relation to the direction of movement of the floor surface such that manure hitting the scraping device 14 is guided radially inwardly towards the inner edge portion 1a of the platform 1. The scraping device 14 is supported by a stationary frame work 16. The stationary frame work 16 may have a shape as an inverted U with a first lower end connected to the scraping device 14 and a second lower end connected to a stationary unit on the outside of the platform 1. A storage device 17 is arranged in the inner space of the annular platform 1. The storage device 17 is adapted to receive manure from the platform 1.

There is a relatively large mounting space for the scraping device 14 in this kind of rotary milking platform. The mounting space for the first end 14a of the scraping device 14 is restricted by the post elements 6a supporting the rump rail 6. The mounting space for the second end 14b of the scraping device 14 is restricted by the post elements 5a supporting the fence members 4 and the feeding troughs 5. The scraping device 14 has to be mounted in a space where it is able to clean at least the parts of milking stalls receiving the rear portions of the cows when they are standing in a milking position. Furthermore, the scraping device 14 has to be able to guide the manure from the milking stalls to the storing device 17 located in the inner space of the annular platform 1. The flexible additional scraping portion 15 has a free end located at the inner edge portion 1a of the platform. Due to the flexible properties of the additional scraping device 15, it is able to move past the post elements 6 and clean the floor surfaces between the post elements 6. Furthermore, the flexible additional scraping portion 15 is able to guide manure from the first end 14a of the scraping device 14 to the storing device 17.

Figure 2A:
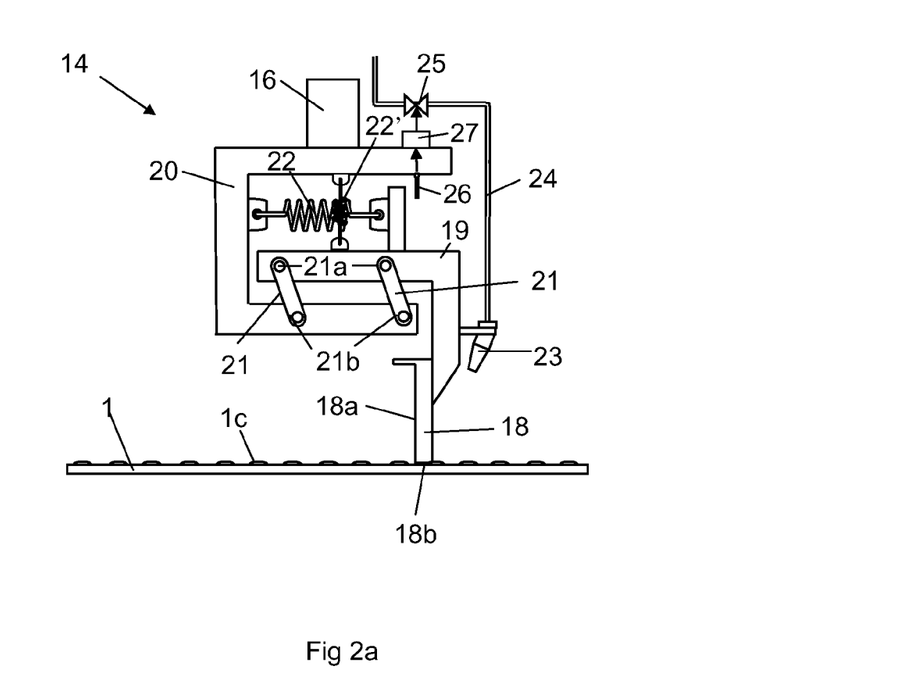
FIG. 2a-c shows side views of the scraping device in FIG. 1 with a scraper in different positions.
Figure 2B:
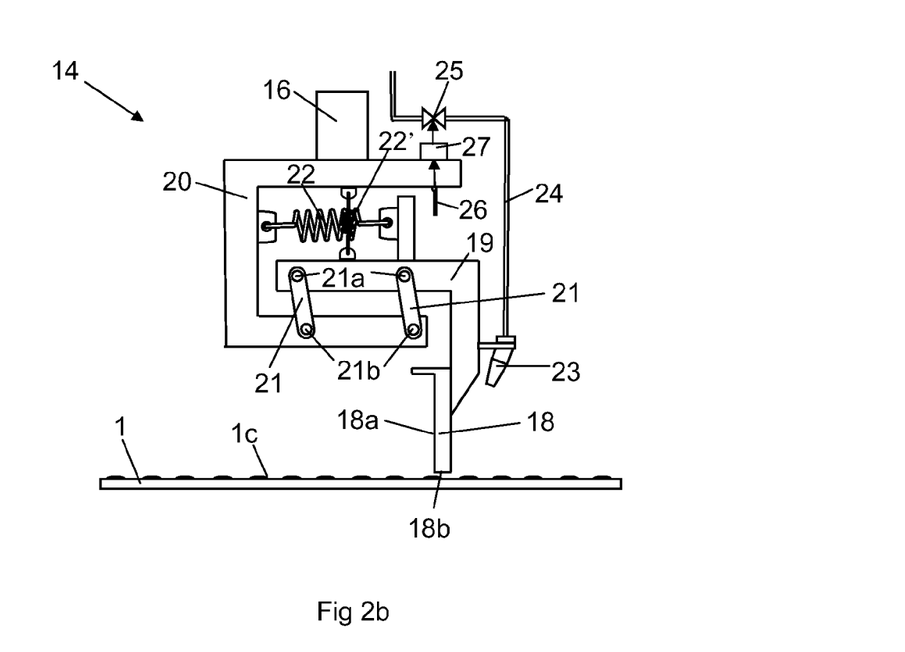
Figure 2C:
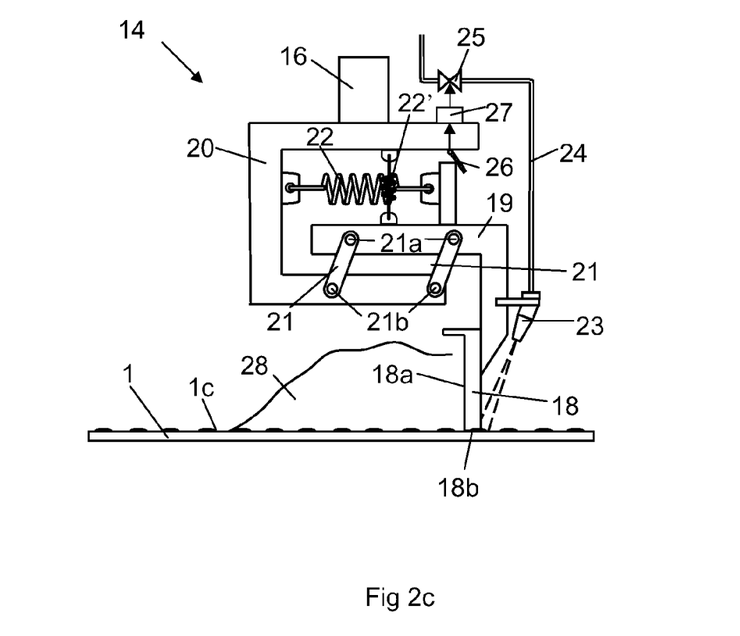

FIGS. 2a-c show the scraping device 14 more in detail. The scraping device 14 is mounted in the stationary frame work 16. In this case, the platform 1 is made of metal and the floor surface 1c comprises a pattern structure preventing cows 2 from slipping. Consequently, the floor surface 1c is not completely even. The scraping device 14 comprises a scraper 18. The scraper 18 comprises a front surface 18a adapted to come in contact with and remove objects such as manure from the floor surface 1c. The scraper 18 comprises a lower surface 18b adapted to come in contact with the floor surface 1c. The scraping device 14 comprises a suspension device adapted to support the scraper 18. The suspension device comprises a first element in the form of an L-shaped element 19 fixedly connected to the scraper 18 and a second element in the form of a U-shaped element 20 fixedly connected to the stationary element 16. The first element 19 is movably connected to the second element 20 by means of two parallel arms 21. The arms 21 are connected to the first element 19 by means of a respective pivot 21a at an upper end portion and connected to the second element 20 by means of a respective pivot 21b at a lower end portion. Further, the first element 19 is connected to the second element 20 by means of a horizontally arranged spring member 22. The spring member 22 exerts a spring force tending to move the first element 19 and the scraper 18 to a first position in relation to the second element 20. Furthermore, the first element 19 is connected to the second element 20 by means of a relatively small vertically arranged spring member 22'.

FIG. 2a shows the first element 19 and the connected scraper 18 in the first position. In the first position, the arms 21 have an inclination in relation to a vertical axis. The scraping device 14 comprises a number of nozzles 23 arranged at a rear side of the scraping device 14. One of these nozzles 23 is shown in FIGS. 2a-c. A water conduit 24 is connected to the nozzle 23. A valve member 25 is adapted to control the supply of water to the nozzle 23 from a water source. The nozzle 23 is arranged on the scraping device 14 in a position such that it is able to supply water to the floor surface 1c on the rear side of the scraper 18. Preferably, the nozzle 23 supplies water to an area of the floor surface 1c located close to the lower surface 18b of the scraper 18. A sensing member 26 is adapted to sense when the first element 19 and the scraper 18 have been displaced from the first position to a second position. A control unit 27 controls the valve member 25 by means of signals from the sensor member 26.

In the first position, the lower surface 18b of the scraper 18 is in contact with the floor surface 1c. The spring member 22 is dimensioned such that it supplies a very small spring force between the first element and the second element in the first position. Thereby, the force pressing the lower surface 18b of the scraper against the floor surface 1c of the platform is substantially the difference between the weight of first element 19 and the scraper 18 and the spring force from the vertical spring member 22'. When the scraper 18 hits an object on the floor surface 1c of the moving platform 1, a force will be applied to the scraper 18. The size of the force acting on the scraper 18 is related to the weight of the object. In case the object is light, the force acting on the scraper 18 is too small to move the scraper 18 from the first position. In this case, the inclined scraper 18 guides the object radially inwardly towards the inner edge portion 1a of the platform 1 and into the storing device 17.

In case the front surface 18a of the scraper hits heavier objects on the floor surface 1c of the moving platform 1, a larger force will be applied to the scraper 18. This force displaces the first element 19 and the scraper 18 in the direction of movement of the platform 1 against the action of the weight of the scraper 18, the weight of the first element 19 and the force from the spring member 22. The displacement of the scraper 18 and the first element 19 results in a swinging motion of the arms 21. During this swinging motion, the upper pivots 21a of the arms 21 will be displaced along a part of a circular path since the lower pivots 21b are stationary mounted. The length of the arms 21 defines the radius of the circular path. During an initial part of the swinging motion, the arms 21 provide a gradually increasing vertical extent. The upper pivots 21a are raised to a successively higher level as well as the first element 19 and the scraper 18.

In case the object has a height lower than the highest level of the scraper 18, the lower end portion 18b of the scraper will undergo an initial raising motion and be lifted to a higher level than the upper portion of the object. FIG. 2b shows the scraper 18 in such an initial raised position. In this case, once the scraper 18 has passed the object, the force acting on the front surface 18a of the scraper 18 ceases and the spring member 22 and the weight of the scraper 18 and first element 19 displaces the scraper 18 back to the first position. The initial raising motion of the scraper 18 prevents that the scraper 18 get stuck in, for example, unevenness in the pattern structured floor surface 1c.

In case the front surface 18a of the scraper 18 hits relatively heavy objects such as manure 28 lying on the floor surface 1c, the scraper 18 will be initially raised according to the above by the force acting on the front surface 18a of the scraper. The scraper 18 is raised until the upper pivots 21a obtain a position straight above the respective lower pivots 21a in which position the arms 21 have an optimal vertical extent. The scraper 18 is raised to a maximum level above the floor surface which is lower than the height of substantially all manure lying on the platform 1. The maximum level of the scraper 18 may be 1 to 2 cm above the floor surface 1c of the platform. Since the manure is higher than the highest level of the lower surface 18b of the scraper, the force acting on the front surface 18a does not cease and the swinging motion of the arms 21 continues. During the following swinging motion, the arms 21 provide a gradually decreasing vertical extent. The upper pivots 21a are lowered as well as the first element 19 and the scraper 18. The lower surface 18b comes in contact with the floor surface 1c. The force acting on the front surface 18a of the scraper 18 is transmitted to a force pressing the lower surface 18b of the scraper 18 against the floor surface 1c of the platform 1.

The scraping device 14 is now in a second position. FIG. 2c shows the scraping device in this position. The sensing member 26 detects that the scraper 18 has been displaced to the second position. The sensing means 26 sends a signal to the control unit 27 which open the valve member 25. The control unit 27 activates the nozzles 23 such that water squirts on the floor surface 1c on the rear side of the scraper 18 in the vicinity of the lower surface 18b of the scraper 18. The inclination of the scraper 18 guides the manure 28 on the front side of the scraper 18 radially inwardly towards the inner edge portion 1a of the platform 1 and into the storing device 17. Possible parts of the manure 28, which has not been removed by the scraper 18, are removed by the water from the nozzles 23. The floor surface 1c on the rear side of the scraping device 14 is now completely cleaned.

When the manure 28 has been removed from the platform 1, the force acting on the front surface 18a of the scraper 18 ceases. The vertical spring member 22' provides an initial raising motion of the scraper 18 and the spring member 22 displaces the first element 19 and the scraper 18 back to the first position. The sensing member 26 detects when the scraper 18 has been displaced from the second position. The sensing member 26 sends a signal to the control unit 27 which closes the valve member 25 and the water supply to the floor surface 1c ceases. Thus, the scraper and the water supply are automatically activated when the scraper 18 hits large objects such as manure lying on the floor surface 1c. The nozzles 23 supply water to the floor surface 1c only when the scraper 18 has been moved to the second position. Furthermore, water is only used for removing the small part of the manure 28 moving past the scraper 18. Consequently, the consumption of water of such a scraping device 14 is very low.

Thus, when the scraper 18 is in the first position, the lower portion 18b of the scraper is in contact the floor surface 1c of the platform. The scraper is pressed against the floor surface 1c with a yieldable force substantially derived from the weight of the scraper 18 and the first element 19. When the scraper 18 hits an obstacle on the floor surface 1c it is lifted upwardly from the floor surface 1c. Thereby substantially no vibrations are transmitted from the scraper 18 to the stationary framework 16 when the scraper 18 is in the first position. When the scraper 18 is in the second position, the resilient suspension device between the first element 19 and the second element 20 reduces at least partly the transmissions of vibrations from the scraper 18 to the framework 16. Thereby, the scraping device 14 is relatively silent during operation.

Figure 3:
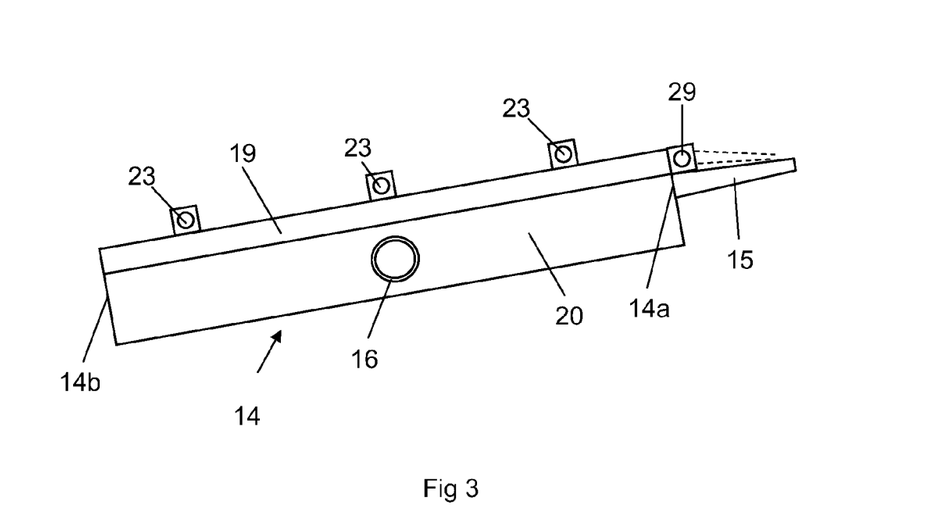
FIG. 3 shows a view from the above of the scraping device in FIG. 1.

FIG. 3 shows a view from the above of the scraping device 14. Three nozzles 23 are here arranged at a rear side of the scraping device 14. Thereby, it is possible to supply water along substantially the whole floor surface 1c on the rear side of the scraper 18. A forth nozzle 29 is arranged at the first end 14a of the scraping device 14. The fourth nozzle 29 is adapted to squirt water on the floor surface 1c on the rear side of the additional scraping member 15. The additional scraping member 15 has to be elastically deformed when it moves past the post members 6a at the vicinity of the inner edge portion 1b of the platform 1. The risk that parts of the manure will move past the additional scraping device 15 is relatively large. Therefore, the water supply from the nozzles 29 to the floor surface 1c behind the additional scraping member 15 is important for cleaning this area of the floor surface 1c.

Figure 4A:
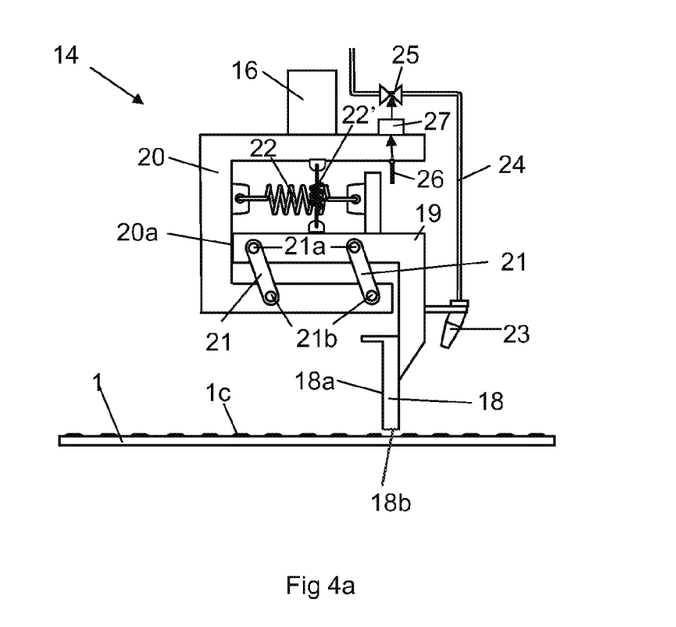
FIG. 4a-b shows a scraping device according to a second embodiment and FIG. 5a-b shows a scraping device according to a third embodiment.
Figure 4B:
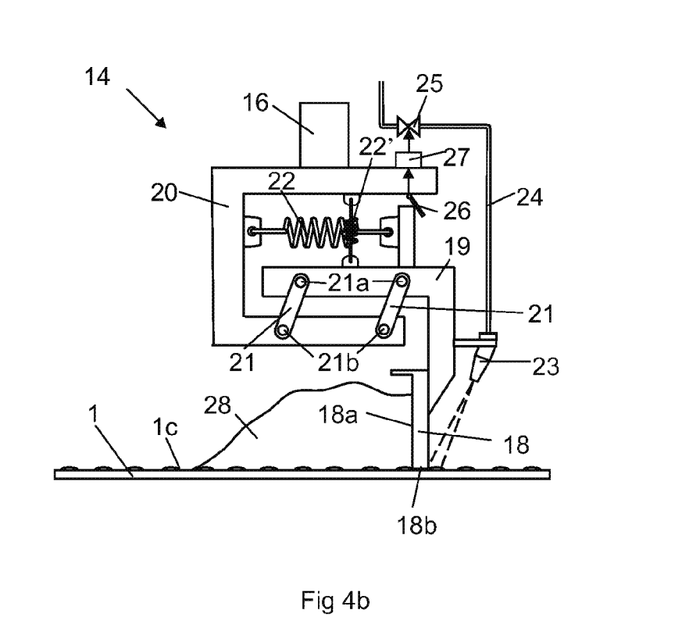

FIG. 4a-b shows a scraping device 14 according to an alternative embodiment of the scraping device in FIG. 2a-c. In this case, the second element 20 comprises a stop surface 20a defining the first position for the first element 19 and the scraper 18. When the scraper 18 is in the first position, the lower surface 18b of the scraper is located at a level above the floor surface 1c of the platform. During the time as the scraper 18 is in the first position above the floor surface 1c of the platform, no vibrations at all are transmitted from the scraper 18 to the stationary framework 16. During the time as the scraper 18 is in the second position, the resilient suspension device reduces at least partly the transmissions of vibrations from the scraper 18 to the framework 16. Also in this case, the scraping device 14 is relatively silent during operation.

Figure 5A:
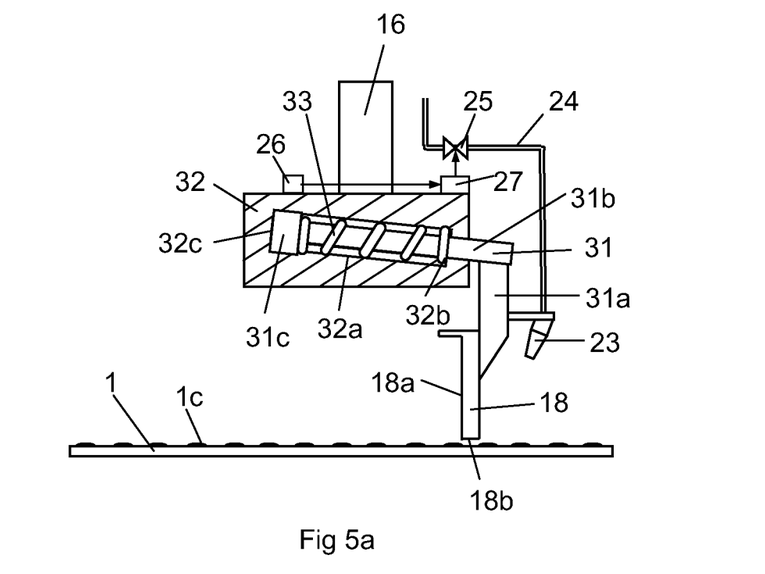
Figure 5B:
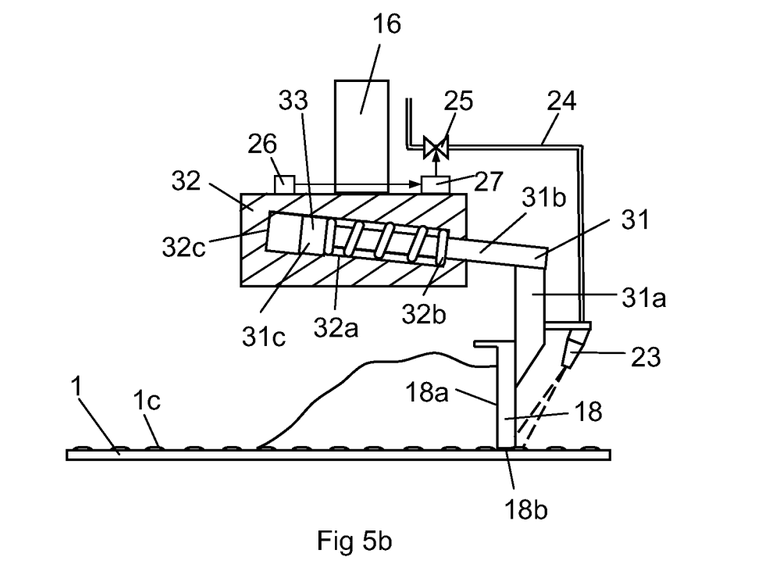

FIG. 5a-b shows a scraping device 14 comprising a further embodiment. In this case, the suspension device comprises a first element 31 fixedly connected to the scraper 18 and a second element 32 fixedly connected to the stationary element 16. The first element 31 comprises a first portion 31a connected to the scraper 18 and an elongated second portion 31b having a head portion 31c at a free end. The second element 32 comprises an elongated recess 32a adapted to receive the elongated portion 31b of the first element 31. The recess 32a has a downwardly sloping straight line extension from an inner end portion forming a stop surface 32c. A spring member 33 is arranged around the elongated portion 31b in the recess 32a. The spring member 33 is arranged between the head portion 31c of the first element 31 and an end surface 32b in the recess 32a of the second element 32. The spring member 33 exerts a force tending to move the first element 31 and the scraper 18 to a first position in relation to the second element 32. The stop surface 32c for the head portion 31c in the recess 32a defines the first position for the scraper 18.

The scraping device 14 comprises a number of nozzles 23 arranged at a rear side of the scraping device 14. One of these nozzles 23 is shown in FIGS. 5a-b. A water conduit 24 is connected to the nozzle 23. A valve member 25 is adapted to control the supply of water to the nozzle 23 from a water source. The nozzle 23 is arranged on the scraping device 14 in positions such that it is able to supply water to the floor surface 1c on the rear side of the scraper 18. The nozzle 23 supplies water to an area of the floor surface 1c located close to the lower surface 18b of the scraper 18. A suitable sensing member 26 is adapted to detect when the head portion 31c of the first element 31 and the scraper 18 have been displaced from the first position to a second position. A control unit 27 controls the valve member 25 by means of signals from the sensor member 26.

FIG. 5a shows the first element 31 and the scraper 18 in the first position. In the first position, the lower surface 18b of the scraper 18 is located at a level above the level of the floor surface 1c. Thereby, there is no risk that the front surface 18a of the scraper hits low obstacles such as unevenness in the floor surface 1c. The spring member 33 holds the first element 31 and the scraper 18 in the first position with a spring force. In case the front surface 18a of the scraper 18 hits manure lying on the floor surface 1c, a force will be applied to the scraper 18. This force displaces the first element 31 and the scraper 18 in the direction of movement of the platform 1 against the action of the spring member 33. Since the recess 32 slopes downwardly from the stop surface 32, the head portion 31c and the scraper 18 are displaced along a downwardly inclined path by this force.

When the scraper comes in contact with the floor surface 1c, the force acting on the front surface 18a of the scraper 18 is transmitted to a force pressing the lower surface 18b of the scraper 18 against the floor surface 1c. The scraping device 14 is now in the second position, which is shown in FIG. 5b. The sensing member 26 detects that the head portion 31c any is no longer in the first position. The sensing means 26 sends a signal to the control unit 27 which open the valve member 25. The control unit activates the nozzles 23, 29 such water squirts on the floor surface 1c on the rear side of the scraper 18 in the vicinity of the lower surface 18b of the scraper 18. The scraper 18 and the additional scraping member 15 deflect the manure 28 radially inwardly towards the inner edge portion 1a of the platform 1 and into the storing device 17. Possible parts of the manure 28, which has not been removed by the scraper 18, are removed by the water from the nozzles 23, 29. The floor surface 1c behind the scraping device is now completely cleaned from manure.

When the manure 28 has been removed from the platform 1, the force acting on the front surface 18a of the scraper 18 ceases and the spring member 33 displaces the scraper 18 back to the first position. The sensing member 26 senses when the head portion 31c of the first element has returned to the first position. The sensing member 26 sends a signal to the control unit 27 which closes the valve member 25 and the water supply to the floor surface 1c ceases. Also in this scraping device 14, the consumption of water will be very low.

During the time as the scraper 18 is in the first position above the floor surface 1c of the platform, no vibrations at all are transmitted from the scraper 18 to the stationary framework 16. During the time as the scraper 18 is in the second position, the resilient suspension device reduces at least partly the transmissions of vibrations from the scraper 18 to the framework 16. Thus, this scraping device is also relatively silent during operation.

The invention is not limited to the described embodiments but may be varied and modified freely within the scope of the claims. The scraping device may, for example, be used on milking platforms of many different kinds.

The invention claimed is:

1. A scraping device (14) for removing objects from a floor surface (1c) of a rotary milking platform (1), the scraping device (14) comprising:
   a scraper (18) having a front surface (18a) configured to come into contact with and move an object on the floor surface (1c) of the rotary milking platform (1) during rotation; and
   a suspension device selectively supporting the scraper (18), the suspension device having i) a first position supporting the scraper adjacent to the floor surface (1c) of the rotary milking platform (1) prior to contact with the object, and ii) a second position supporting the scraper such that a lower surface (18b) of the scraper (18) is pressed against the floor surface (1c) with a downward, first force,
   wherein the suspension device is configured such that when the object on the floor surface (1c) hits the scraper (18) during rotation of the rotary milking platform (1), the suspension device moves from the first position to the second position and with the suspension device in the second position, a force of the object acting on the front surface (18a) of the scraper (18), during the rotation of the rotary milking platform, is transmitted as a second force that increases the downward first force pressing the lower surface (18b) of the scraper (18) against the floor surface (1c) of the platform.

2. The scraping device according to claim 1, wherein the suspension device is configured so that in the first position of the scraper (18), prior to contact with the object, the suspension device supports the scraper (18) in contact with the floor surface (1c).

3. The scraping device according to claim 1, wherein the suspension device is configured so that in the first position of the scraper (18), prior to contact with the object, the suspension device supports the scraper (18) above the floor surface (1c), not in contact with the floor surface (1c).

4. The scraping device according to claim 1, wherein the suspension device comprises a force transmitting mechanism configured to transfer i) the second force from the object on the rotary platform (1) acting on the front surface (18*a*) of the scraper (18) when the object hits the scraper (18) to ii) the first force pressing the scraper against the floor surface (1*c*) in the second position, thereby increasing the total downward force of the lower surface (18*b*) of the scraper (18) against the floor surface (1*c*) of the platform.

5. The scraping device according to claim 1, wherein the suspension device comprises a spring member (22) adapted to hold the scraper (18) in the first position with a spring force.

6. The scraping device according to claim 1, wherein the suspension device comprises a first element (19, 31) connected to the scraper (18), a second element (20, 32), and a movable connection between the first element (19, 31) and the second element (20, 32) defining a path of movement of the scraper (18) when the scraper (18) is moved from the first position to the second position.

7. The scraping device according to claim 6, wherein the movable connection defines a path of movement of the scraper (18) with i) the suspension supporting the scraper in the first position prior to hitting the object, and ii) after hitting the object, the suspension initially supporting the scraper in an intermediate position with the scraper (18) raised to a higher level above the floor surface (1*c*) than in the first position, and then the suspension supporting the scraper at the level of the floor surface (1*c*) such the scraper is in the second position with the scraper (18) pressed against the floor surface (1*c*) with the first force.

8. The scraping device according to claim 6, wherein the movable connection comprises two parallel arms (21) pivotally connected to the first element (19) at an end portion and pivotally connected to the second element (20) at an opposite end portion.

9. The scraping device according to claim 6, wherein the movable connection defines the path of movement of the scraper (18) which continuously lowers a level of the scraper (18) from the first position to the second position.

10. The scraping device according to claim 6, wherein the movable connection comprises an elongated recess (32*a*) in one of the first element (31) or in the second element (32) and a protruding member (31*b*) in the other of the first element or the second element which is displaceably arranged in the elongated recess (32*a*).

11. The scraping device according to claim 6 in combination with the rotary platform, and further comprising a stationary framework (16) in a position at a side of the rotary platform (1), wherein the second element (20, 32) is supported by the stationary framework (16).

12. The scraping device according to claim 1, further comprising at least one nozzle (23, 29), which is adapted to supply a cleaning liquid to an area of the floor surface (1*c*) located on a rear side of the scraper (18).

13. The scraping device according to claim 12, further comprising a controller configured to automatically activate a supply of the cleaning liquid to the area of the floor surface (1*c*) when the scraper (18) is in the second position.

14. The scraping device according to claim 1 in combination with the rotary platform, wherein the scraper (18) has an extension between a first end (14*a*) arranged at a first radial distance ($r_1$) from a rotational center (3) of the rotary platform (1) and a second end (14*b*) arranged at a second radial distance ($r_2$) from the rotational center (3) of the rotary platform (1) such that objects located on the floor surface (1*c*) of the rotary platform at a radial distance between the first radial distance ($r_1$) and the second radial distance ($r_2$) come in contact with the scraper (18).

15. The scraping device according to claim 14, wherein the scraper (18) has an inclination in relation to a direction of movement of the object on the floor surface (1*c*) in front of the scraper (18) such that the scraper (18) guides the object in a radial direction on the floor surface (1*c*) towards an inner edge portion (1*a*) or an outer edge portion (1*b*) of the rotary platform (1).

16. The scraping device according to claim 1, further comprising a storage device (17) configured to receive objects which have been removed from the floor surface (1*c*) of the rotary platform by the scraper (18).

17. The scraping device according to claim 1, wherein the scraper (18) has an extended scraping portion (15) at one end (14*a*, 14*b*) of the scraper (18), the extended scraping portion (15) having flexible properties.

18. The scraping device according to claim 1, wherein,
the suspension device comprises a first element (19) connected to the scraper (18), a second element (20), and a pair of movable arms connecting the first element (19) and the second element (20) and defining a path of movement of the scraper (18) when the scraper (18) is moved from the first position to the second position,
when the suspension device supports the scraper in the first position, each of the connecting arms is generally vertically oriented in a first direction with respect to a respective vertical drawn from a lower end of each connecting arm, and supports the scraper at a first vertical extent from the floor surface, and
when the suspension device supports the scraper in the second position, each of the connecting arms is generally vertically oriented in a second direction with respect to the vertical drawn from the lower end of each connecting arm and supports the scraper in contact with the floor surface, the second direction being opposite the first direction.

19. A scraping device (14), comprising:
a rotary milking platform (1) with a floor surface;
a scraper (18) for removing an object from the floor surface (1*c*) of the rotary milking platform (1), the scraper (18) configured to come into contact with and move the object on the floor surface (1*c*) of the rotary milking platform (1) during rotation; and
a suspension device selectively supporting the scraper (18), the suspension device having i) a first position that, prior to contact with the object, supports the scraper adjacent to the floor surface (1*c*) of the rotary milking platform (1), and ii) a second position that, subsequent to the contact with the object, supports the scraper such that the scraper (18) is pressed against the floor surface (1*c*) with a first force,
wherein the suspension device is further configured such that when the object on the floor surface (1*c*) hits the scraper (18) during rotation of the rotary milking platform (1), the suspension device moves from the first position to the second position, and with the suspension device in the second position and during the rotation of the rotary milking platform (1), a force of the object acting of the front surface (18*a*) of the scraper (18) is transmitted to increase the downward first force pressing the lower surface (18*b*) of the scraper (18) against the floor surface (1*c*) of the platform.

20. The scraping device according to claim 19, wherein,
the suspension device comprises a first element (19) connected to the scraper (18), a second element (20) mounted to a stationary frame work (16), and a pair of movable arms connecting the first element (19) and the second element (20) and defining a path of movement of the scraper (18) when the scraper (18) is moved from the first position to the second position, when the suspension device supports the scraper in the first position, each of the connecting arms i) is generally vertically oriented in a first direction with respect to a respective vertical drawn from a lower end of each connecting arm, and ii) supports the scraper at a first vertical extent from the floor surface, and when the suspension device supports the scraper in the second position, each of the connecting arms i) is generally vertically oriented in a second direction with respect to the vertical drawn from the lower end of each connecting arm and ii) supports the scraper in contact with the floor surface, the second direction being opposite the first direction.

* * * * *